United States Patent

Pawlakowitsch

[11] Patent Number: 5,348,313
[45] Date of Patent: Sep. 20, 1994

[54] RADIAL SHAFT SEALING RING

[75] Inventor: Anton Pawlakowitsch, Alzenau, Fed. Rep. of Germany

[73] Assignee: Leybold AG, Hanau, Fed. Rep. of Germany

[21] Appl. No.: 20,851

[22] Filed: Feb. 19, 1993

Related U.S. Application Data

[63] Continuation of Ser. No. 770,855, Oct. 3, 1991, abandoned.

[30] Foreign Application Priority Data

Aug. 1, 1991 [DE] Fed. Rep. of Germany ....... 4125498

[51] Int. Cl.$^5$ .................................................. F16J 15/40
[52] U.S. Cl. ................................... 277/135; 277/14 V; 277/152
[58] Field of Search ................... 277/14 V, 14 R, 13, 277/152, 53, 135

[56] References Cited

U.S. PATENT DOCUMENTS

| | | | |
|---|---|---|---|
| 2,177,441 | 10/1939 | Pesarese | 277/152 |
| 2,291,248 | 7/1942 | Myers | 277/135 |
| 2,367,882 | 1/1945 | McKnight | 277/135 |
| 2,369,883 | 2/1945 | Coopey | 277/135 |
| 2,547,428 | 4/1951 | Ziherl | 277/135 |
| 2,665,929 | 1/1954 | Sawyer | 277/14 |
| 2,799,532 | 7/1957 | Smart | 277/135 |
| 3,510,177 | 5/1970 | Shimula | 277/3 |
| 3,681,142 | 8/1972 | Schmitt . | |
| 3,912,284 | 10/1975 | Gosling et al. | 277/53 X |
| 4,171,818 | 10/1979 | Moskowitz et al. | 277/135 X |
| 4,413,829 | 11/1983 | Pietsch | 277/3 |
| 5,053,661 | 10/1991 | Kitamura et al. | 277/152 X |
| 5,165,699 | 11/1992 | Shrontz et al. | 277/135 |

FOREIGN PATENT DOCUMENTS

| | | | |
|---|---|---|---|
| 0412634 | 2/1991 | European Pat. Off. . | |
| 1895399 | 3/1962 | Fed. Rep. of Germany . | |
| 1915150 | 10/1969 | Fed. Rep. of Germany . | |
| 1750230 | 4/1972 | Fed. Rep. of Germany . | |
| 3106318 | 9/1982 | Fed. Rep. of Germany . | |
| 1361015 | 4/1964 | France | 277/153 |
| 0013872 | 1/1987 | Japan | 277/135 |
| 0145874 | 6/1988 | Japan | 277/152 |
| 564716 | 7/1975 | Switzerland . | |
| 1429939 | 3/1976 | United Kingdom | 277/152 |
| 1537595 | 1/1979 | United Kingdom . | |
| 2213540 | 8/1989 | United Kingdom | 277/152 |

OTHER PUBLICATIONS

Müller, H. K.: Abdichtung bewegter Maschinenteile Medienverlag, 1990, Seiten 29–45.
Ferrofluidics Corporation brochure "Solving Vacuum Feedthrough Problems with Ferrofluidic Seals".

*Primary Examiner*—William A. Cuchlinski, Jr.
*Assistant Examiner*—John L. Beres
*Attorney, Agent, or Firm*—Felfe & Lynch

[57] ABSTRACT

The invention relates to a shaft seal for sealing a shaft pass-through (3) of vacuum apparatus, which accommodates a shaft (2), having at least one annular seal (4) which is disposed in a housing part and with which a barrier liquid (5) is associated, while the sealing part (6) of the annular seal facing the shaft (2) forms with the shaft an annular chamber (8) in which the barrier liquid (5) is provided, in order in this manner to bind particles formed by attrition.

6 Claims, 1 Drawing Sheet

RADIAL SHAFT SEALING RING

This application is a continuation of application Ser. No. 770,855, filed Oct. 3,1991 now abandoned.

BACKGROUND OF THE INVENTION

The invention relates to a shaft seal for sealing a vacuum apparatus pass-through carrying a shaft, with at least one annular seal disposed in a housing portion, with which a barrier liquid is associated.

A ferromagnetic shaft seal is already known (cf. brochure of Ferrofluidics Corporation, page 6), which operates on the contactless principle. The ferromagnetic rotary shaft seal operates on the basis of a positive liquid barrier and thus forms a seal having very little leakage. The seal consists of a permanent magnet, a magnetic permeable focusing system, and a single magnetic liquid seal. The sealing of the shaft is accomplished with little energy. Such seals are used especially in shaft pass-throughs of vacuum apparatus. The seal consists in detail of a magnet surrounding the shaft and adjoined on both sides by two O-ring seals. Furthermore, the shaft must consist of a ferromagnetic material. On account of the contactless sealing of the magnet and the magnetic liquid this seal has a very long life. The disadvantage of such seals is the very high manufacturing cost of the individual components, especially of the permanent magnet.

Accordingly it is the object of the invention to create a shaft seal for shaft pass-throughs of vacuum apparatus, which, while keeping the manufacturing costs low, provides a very good seal and avoids any great wear of shaft and seal.

SUMMARY OF THE INVENTION

The invention solves the problems in that the sealing part of the annular seal facing the shaft forms with the shaft an annular gap in which the barrier fluid is provided. Thus, in a simple manner, a very cost-effective sealing of a shaft pass-through between a vacuum chamber and a space subject to atmospheric pressure is created. Since an annular gap is provided advantageously between the annular seal and the shaft, and the barrier liquid creates a seal with minimal contact surface, the attrition of shaft and seal in the sealing area is almost entirely eliminated. By preventing attrition, contamination in the interior of the space containing the parts to be coated is nearly entirely prevented, and thus the rejection rate of the parts being coated is largely eliminated. If nevertheless attrition should occur in the sealing area, these particles can be absorbed or bonded in the barrier liquid and thus will not enter into the vacuum chamber. Through the use of a barrier liquid of high molecular weight and a very low vapor pressure, pressures up to $10^{-6}$ Pa and more can be achieved.

To this end it is advantageous for the annular seal surrounding the shaft to have an annular chamber to accommodate the barrier liquid. The barrier liquid by which the vacuum side can be perfectly sealed from the high-pressure side can be accommodated in the annular chamber in a very simple manner and assures that no particles will enter the vacuum chamber.

It is furthermore advantageous that the seal has a high-pressure side as well as a low-pressure side, a sealing lip of the annular seal being provided on the low-pressure side and being adjoined by the annular chamber for accommodating the barrier liquid. An additional possibility, according to a further development of the device according to the invention, is that the annular chamber for holding the barrier liquid flares funnel-wise from the sealing lip toward the low-pressure side.

In further development of the invention it is advantageous for the distance between the radially reaching inner edge of the sealing lip and the surface of the shaft to be selected according to the viscosity of the barrier liquid. This distance can be provided whenever, for example, several seals are arranged in tandem, at least one seal being in contact with the surface or having such a small gap that no barrier liquid can flow out through it. Instead, a very thin film forms as a sealant in the annular gap or between the surface of the shaft and the radially reaching edge of the annular seal.

According to a preferred embodiment of the solution according to the invention, provision is lastly made for the barrier liquid to consist of a liquid of high molecular weight which is placed in the annular chamber.

It is of special importance to the present invention that the barrier liquid consists of an oil of high molecular weight, especially of a vacuum oil which is placed in the annular chamber. Through the use of a high-molecular oil it is possible to assure, in addition to a perfect, virtually contactless sealing of the shaft, that very low pressures are reached in the vacuum chamber, which can be on the order of magnitude of about $10^{-6}$.

In connection with the shaft sealing system it is advantageous that the central axis of the shaft and/or of the annular seal is vertical and that the annular chamber opens toward the vacuum chamber. This is especially advantageous when the annular chamber is not additionally sealed from the vacuum chamber with a gasket.

It is furthermore advantageous that the annular chamber containing the barrier liquid has one or more annular seals arranged labyrinth-like with respect to the shaft and is sealed contactlessly by at least one gasket, in which case the adhesion forces of the barrier liquid advantageously contribute to the sealing.

The barrier liquid can also extend beyond the annular chamber and cover the end face of the housing part of the annular seal between the surface of the shaft and the outer wall of the recess in order to close the penetration vacuum-tight overall.

Additional details of the invention are described and set forth in the subordinate claims, in the description and in the figures, and it is to be noted that all individual features and all combinations of individual features are important to the invention.

BRIEF DESCRIPTION OF THE DRAWING

In the figures the invention is set forth in an embodiment by way of example, without being limited to this embodiment.

DESCRIPTION OF THE PREFERRED EMBODIMENT

Figure 1:
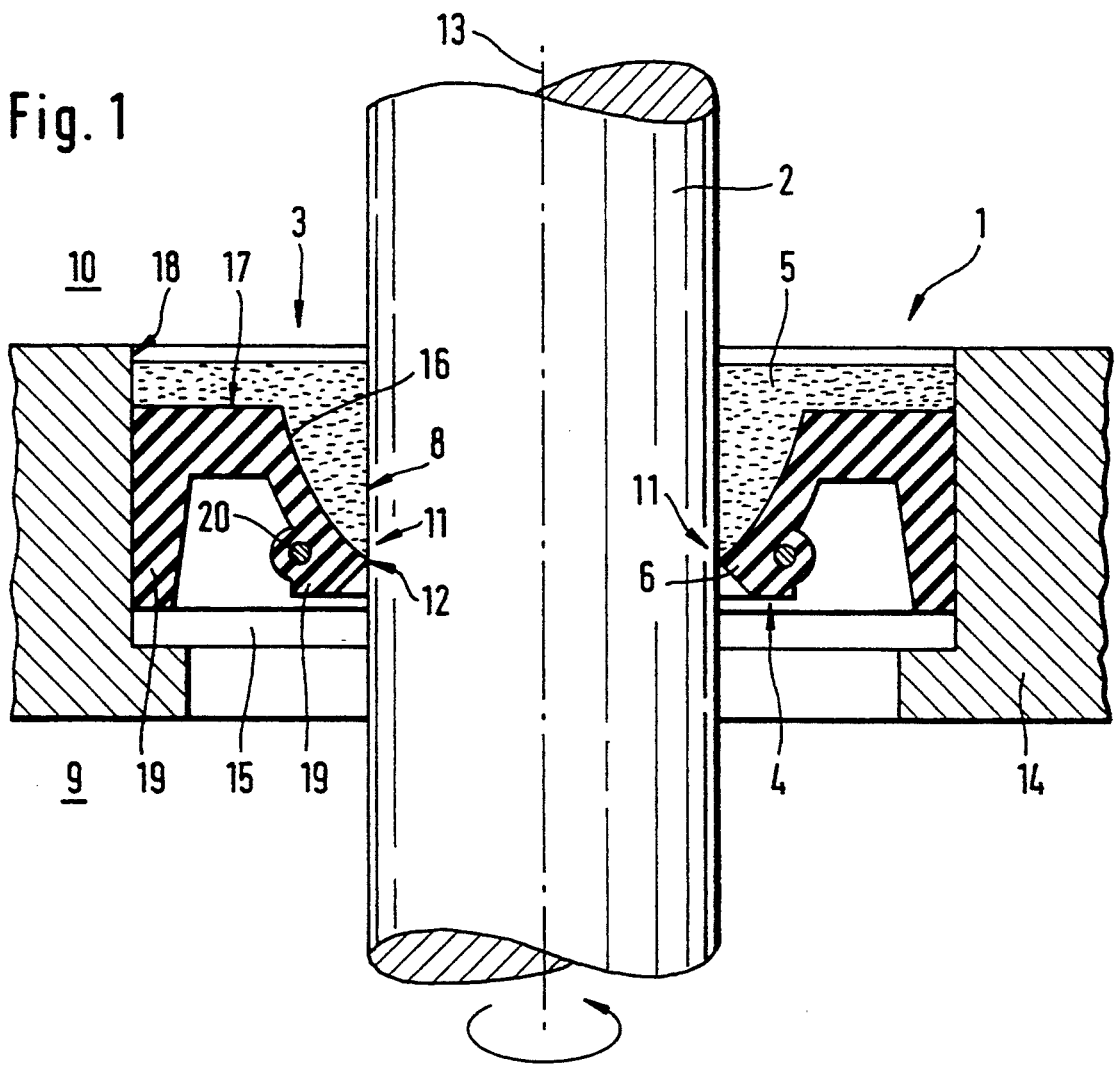
FIG. 1 shows a radial seal for a shaft of a sputtering apparatus.
Figure 2:
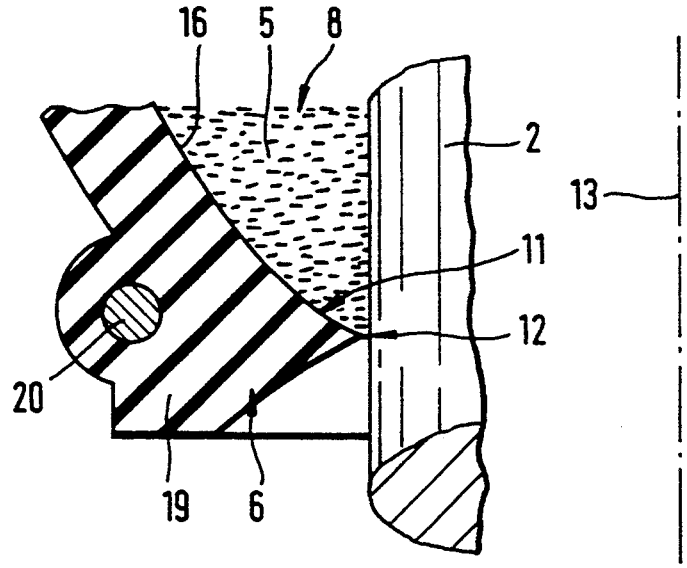
FIG. 2 a fragmentary view of the radial seal of FIG. 1.

In the drawing, 1 identifies a shaft seal for sealing a pass-through 3 of vacuum apparatus containing a shaft 2.

The shaft 2 can be connected to a drive means not represented in the drawing, and is disposed vertically as shown in FIG. 1 and in accordance with each embodiment.

In FIG. 1, 9 identifies a high-pressure side, or the space surrounding the apparatus which is subject to atmospheric pressure, while 10 identifies an only partially indicated vacuum chamber or low-pressure side. The vacuum chamber 10 is surrounded by a housing wall 14 in which a cylindrical recess 15 is provided, in which the shaft 2 as well as the annular seal 4 surrounding the shaft is concentrically contained.

The annular seal represented in FIG. 1 is configured as a radial seal and reinforced by means of a ring 20 which is contained in the interior of the radial seal. The annular seal 4 has a sealing lip 11 reaching toward the shaft 2, which is defined by an edge 12. The edge 12 represented in FIG. 1,2 can be slightly flexed laterally away without thereby greatly increasing the attrition on the sealing element.

As it appears especially from FIG. 1, the edge 12 of the annular seal 4 can lie against the surface of the shaft 2, or it can also be disposed at a slight distance from the surface of the shaft. The distance between the radially reaching inner edge 12 of sealing lip 11 and the surface of the shaft is selected according to the viscosity of the barrier liquid. The distance in any case is made so slight that no barrier liquid 4 can escape outwardly or into the space 9 surrounding the vacuum chamber. The barrier liquid 5 assures that particles formed by the attrition of the seal will remain bound in the barrier liquid 5 and thus will be unable to enter into the interior of the vacuum chamber 10.

As it appears in FIG. 1, the annular seal 4 surrounding the shaft 2 has an annular chamber 8 to accommodate the barrier liquid 5. The annular chamber 8 for accommodating the barrier liquid 5 flares funnel-wise from the sealing lip 11 toward the low-pressure side. The sealing part 6 of the annular seal 4 has for this purpose a wall portion 16 which forms the annular chamber 8. The chamber 8 is defined on the one hand by the bottom edge 12 and on the other by a face side 17 extending radially. The barrier liquid 5 is contained in the annular chamber 8. The barrier liquid 5 can consist of a liquid of high molecular weight, especially a high-molecular oil, namely vacuum oil.

As it furthermore appears from FIG. 1, a central axis 13 of the shaft 2 and/or of the annular seal 4 runs vertically, the annular chamber 8 being open toward the vacuum chamber. This corresponds to the common method of construction of the sealing device according to the invention. In this manner the barrier liquid is prevented from spilling toward the vacuum chamber. The vapor pressure of the barrier liquid is selected such that pressures of at least $10^{-6}$ can be reached in the vacuum chamber.

In the embodiment according to FIG. 1, only one annular seal is represented. It is also possible, however, depending on the application, to provide several annular seals on the shaft.

The annular chamber 8 containing the barrier liquid 5 can also be sealed against the shaft in a contact-free manner by one or more annular seals in a labyrinthine manner, especially when the shaft is not precisely aligned in the vertical direction, in order thereby to prevent barrier liquid from running into the vacuum chamber, in which case the adhesion forces of the barrier liquid contribute advantageously to the sealing.

It is possible, furthermore, that two annular seals disposed side by side can form a closed annular chamber represented only in part in FIG. 1, in which the barrier liquid can be contained. The possibility thus exists of inclining the shaft to a certain degree without the danger that the liquid will spill into the interior vacuum.

The barrier liquid can also extend beyond the annular chamber 8 and cover the face 17 of body part 19 of the annular seal 4 between the surface of the shaft 2 and the outer wall 18 of the recess 15 in order to block penetration in an overall vacuum-tight manner.

I claim:

1. A shaft seal for sealing a passage accommodating a rotary shaft in vacuum apparatus having a housing part, comprising:

at least one annular sealing member having a lower high pressure side and an upper low pressure side and disposed in a housing part, the sealing member forming with the rotary shaft an upper annular chamber for accommodating a blocking liquid as a pool;

the sealing member having between the low pressure side and the high pressure side a single sealing lip adjoining the annular chamber which is upwardly open to a vacuum chamber while the shaft is rotating normally;

the sealing member and the rotary shaft having a central axis which runs in a vertical direction; and a blocking liquid of high molecular weight disposed in the annular chamber as a pool and having a total upper pool surface upwardly open to the vacuum chamber while the shaft is rotating normally, the blocking liquid of the annular chamber being pooled against the sealing member in contact with the vacuum chamber in such manner that the total upper surface of the pool of the blocking liquid has a direct contact with the vacuum chamber and is fully exposed thereto while the shaft is rotating normally.

2. Shaft seal according to claim 1, in which the annular chamber for the accommodation of the barrier liquid flares funnel-wise from the sealing lip to the low pressure side.

3. Shaft seal according to claim 1, in which the sealing member has a radially reaching inner edge and in which the distance between the radially reaching inner edge, the sealing lip and the shaft is selected according to the viscosity of the barrier liquid.

4. Shaft seal according to claim 1, in which the barrier liquid consists of a high-molecular weight liquid.

5. Shaft seal according to claim 1, in which the barrier liquid consists of a high-molecular weight oil.

6. Shaft seal according to claim 1, in which the annular sealing member has an end face and in which the barrier liquid extends beyond the annular chamber and also covers the end face of the annular seal.

* * * * *